(12) United States Patent
Zeitzew (10) Patent No.: US 7,844,396 B2
(45) Date of Patent: Nov. 30, 2010

(54) METHOD AND SYSTEM FOR MODULAR DATA PROCESSING FOR A VEHICLE CONTROL SYSTEM

(75) Inventor: Michael Alan Zeitzew, Redondo Beach, CA (US)

(73) Assignee: Deere & Company, Moline, IL (US)

( * ) Notice: Subject to any disclaimer, the term of this patent is extended or adjusted under 35 U.S.C. 154(b) by 1473 days.

(21) Appl. No.: 11/225,436

(22) Filed: Sep. 13, 2005

(65) Prior Publication Data

US 2007/0061053 A1  Mar. 15, 2007

(51) Int. Cl.
G01C 21/00 (2006.01)

(52) U.S. Cl. .......... 701/213; 367/127; 342/350; 342/357.06; 342/462; 701/214

(58) Field of Classification Search .......... 701/1, 701/23, 36, 3, 200, 11–16, 213–214; 365/1; 342/13, 350, 462, 357.06; 367/127
See application file for complete search history.

(56) References Cited

U.S. PATENT DOCUMENTS

| | | | | |
|---|---|---|---|---|
| 5,340,056 | A * | 8/1994 | Guelman et al. | 244/3.16 |
| 5,341,540 | A | 8/1994 | Soupert et al. | 15/319 |
| 5,642,467 | A | 6/1997 | Stover et al. | 395/85 |
| 5,646,843 | A | 7/1997 | Gudat et al. | 364/424.012 |
| 5,684,696 | A | 11/1997 | Rao et al. | 364/424.029 |
| 5,696,675 | A | 12/1997 | Nakamura et al. | 364/424.027 |
| 6,122,572 | A * | 9/2000 | Yavnai | 701/23 |
| 6,130,705 | A * | 10/2000 | Lareau et al. | 348/144 |
| 6,205,400 | B1 * | 3/2001 | Lin | 701/214 |
| 6,292,830 | B1 * | 9/2001 | Taylor et al. | 709/224 |
| 6,409,122 | B1 * | 6/2002 | Nicolai | 244/106 |
| 6,411,055 | B1 | 6/2002 | Fujita et al. | 318/568 |
| 6,446,905 | B1 * | 9/2002 | Campbell et al. | 244/2 |
| 6,643,576 | B1 | 11/2003 | O Connor et al. | 701/50 |

(Continued)

FOREIGN PATENT DOCUMENTS

EP  1047983 B1  3/2005

(Continued)

OTHER PUBLICATIONS

Control architectures for autonomous underwater vehicles; Valavanis, K.P.; Gracanin, D.; Matijasevic, M.; Kolluru, R.; Demetrio G.A.; Control Systems Magazine, IEEE; vol. 17, Issue 6, Dec. 1997 pp. 48-64; Digital Object Identifier 10.1109/37.642974.*

(Continued)

*Primary Examiner* — Cuong H Nguyen
(74) *Attorney, Agent, or Firm* — Yee & Associates, P.C.; Dawn C. Wolff (57) ABSTRACT

The present invention is for a modular, extensible software system for use with multi-modal, autonomous, or semi-autonomous vehicles. The design of the present invention involves the coherent integration of modules with responsibilities for human-interaction, training, path planning, mission execution, navigation, and safety to develop and complete missions. The present invention provides a modular software system that expresses vehicle behaviors through numerous small-grain elements to complete a mission. The system can be easily adapted or modified by adding new software modules or modifying existing modules as missions change or expand, with the smaller-grain modules being easier to adapt and reuse.

13 Claims, 7 Drawing Sheets

U.S. PATENT DOCUMENTS

| | | | |
|---|---|---|---|
| 6,674,687 B2 * | 1/2004 | Zeitzew | 367/6 |
| 6,678,744 B2 | 1/2004 | Moon et al. | 709/328 |
| 6,711,468 B2 | 3/2004 | Bottero et al. | 700/245 |
| 6,813,559 B1 * | 11/2004 | Bodin et al. | 701/206 |
| 6,856,894 B1 * | 2/2005 | Bodin et al. | 701/206 |
| 6,859,729 B2 * | 2/2005 | Breakfield et al. | 701/216 |
| 7,107,148 B1 * | 9/2006 | Bodin et al. | 701/206 |
| 7,130,741 B2 * | 10/2006 | Bodin et al. | 701/206 |
| 7,231,294 B2 * | 6/2007 | Bodin et al. | 701/206 |
| 7,242,791 B2 * | 7/2007 | Han et al. | 382/104 |
| 7,479,922 B2 * | 1/2009 | Hunt et al. | 342/357.02 |
| 7,584,020 B2 * | 9/2009 | Bruemmer et al. | 700/245 |
| 7,739,006 B2 * | 6/2010 | Gillula | 701/24 |
| 2002/0092949 A1 * | 7/2002 | Nicolai | 244/106 |
| 2003/0051071 A1 | 3/2003 | Stefansson et al. | 719/328 |
| 2003/0098810 A1 | 5/2003 | Lee et al. | 342/357.06 |
| 2003/0142587 A1 * | 7/2003 | Zeitzew | 367/127 |
| 2003/0169003 A1 | 9/2003 | Cao et al. | 318/432 |
| 2004/0006566 A1 * | 1/2004 | Taylor et al. | 707/100 |
| 2004/0158355 A1 * | 8/2004 | Holmqvist et al. | 700/245 |
| 2005/0004723 A1 * | 1/2005 | Duggan et al. | 701/24 |
| 2005/0103867 A1 | 5/2005 | Zhu et al. | 235/462.45 |
| 2005/0111697 A1 | 5/2005 | Yamamoto et al. | 382/103 |
| 2005/0129495 A1 | 6/2005 | Brogardh | 414/680 |
| 2005/0149228 A1 | 7/2005 | Lee | 700/245 |
| 2005/0149256 A1 | 7/2005 | Lawitzky et al. | 701/207 |
| 2005/0165720 A1 | 7/2005 | McKeown et al. | 707/1 |
| 2006/0184292 A1 * | 8/2006 | Appleby et al. | 701/23 |
| 2006/0220954 A1 * | 10/2006 | Hunt et al. | 342/357.02 |
| 2007/0021879 A1 * | 1/2007 | DelNero et al. | 701/23 |
| 2007/0061053 A1 * | 3/2007 | Zeitzew | 701/1 |
| 2008/0195269 A1 * | 8/2008 | Lacy et al. | 701/24 |

FOREIGN PATENT DOCUMENTS

| | | |
|---|---|---|
| EP | 1707979 A2 * | 10/2006 |
| GB | 2432922 A * | 6/2007 |
| GB | 2462927 A * | 3/2010 |
| WO | WO 9635982 A1 * | 11/1996 |

OTHER PUBLICATIONS

Software radios for airborne platforms; Cummings, J.P.; Selected Areas in Communications, IEEE Journal on; vol. 17, Issue 4, Apr. 1999 pp. 732-747; Digital Object Identifier 10.1109/49.761049.*

Software technology for implementing reuseable, distributed computer software systems; Heck, B.S.; Wills, L.M.; Vachtsevanos, G.J.; Control Systems Magazine, IEEE, vol. 23, Issue 1, Feb. 2003 pp. 21-35, Digital Object Identifier 10.1109/MCS.2003.1172827.*

Generic integrated PHM/controller system; Brotherton, T.; Luppold, R.; Padykula, P.; Wade, R.; Aerospace Conference, 2005 IEEE; Mar. 5-12, 2005 pp. 3427-3437; Digital Object Identifier 10.1109/AERO. 2005.1559645.*

Development of autonomous flight control system for . . . unmanned airship; Sang-Jong Lee; Seong-Pil Kim; Tae-Sik Kim; Hyoun-Kyoung Kim; H, Chang Lee; Intelligent Sensors, Sensor Networks and Information Processing Conference, 2004. Proceedings of the Dec. 14-17, 2004 pp. 457-461, Digital Object Identifier 10.1109/ISSNIP.2004.1417504.*

Testing Critical Software: A Case Study for an Aerospace Application; Loubach, D.S.; Nobre, J.C.S.; da Cunha, A.M.; Dias, L.A.V.; Nascimento, M.R.; Dos Santos, W.A.; 25th Digital Avionics Systems Conference, 2006 IEEE/AIAA; Oct. 15-19, 2006 pp. 1-9 Digital Object Identifier 10.1109/DASC.2006.313741.*

A Hardware/Software Architecture for UAV Payload and Mission Control; Pastor, E.; Lopez, J.; Royo, P.; 25th Digital Avionics Systems Conference, 2006 IEEE/AIAA; Oct. 15-19, 2006 pp. 1-8; Digital Object Identifier 10.1109/DASC.2006.313738.*

Multi-Vehicle Cooperative Control Flight Test; Pongpunwattana, A.; Wise, R.; Rysdyk, R.; Kang, A.J.; 25th Digital Avionics Systems Conference, 2006 IEEE/AIAA; Oct. 15-19, 2006 pp. 1-11; Digital Object Identifier 10.1109/DASC.2006.313717.*

[PDF] An Automated UAV Mission System—File Format: PDF/Adobe Acrobat—View as HTML Apr. 25, 2003.*

Evaluating UAV Flock Mission Performance Using Dudek's Taxonomy; the performance of a group of autonomous UAVs cooperating in mission execution against a group of enemy agents acting in an unknown environment. . . from ieeexplore.ieee.org/ie15/9861/31519/01470734.pdf.*

Arie Yavnai, "Context Recognition and Situation Assessment in Autonomous Mobile Robots", vol. 1831pp. 119-130 (1992). month, date unknown, cited by other.*

F.C.A. Groen et al., "Intellignet Autonomous Systems", pp. 428-438. no date, cited by other.*

Arie Yavnai, "Criteria of System Autonomability", pp. 448-458. no date, cited by other.*

Arie Yavnai, "Distributed Decentralized Architecture for Autonomous Cooperative Operation of Multiple Agent System", pp. 95-101, cited by other.*

Arie Yavnai, "Arbitration Network, A New Approach for Combining Reflexive Behaviors and Reasoning-Drive Behaviors in Intelligent Autonomous", pp. 428-438. no date, cited by other.*

Arie Yavnai, "Context Recognition and Situation Assessment in Autonomous Mobile Robots", pp. 119-130, vol. 1831 Mobile Robots VII, (1992). month/date unknown, cited by other.*

Flight at the End of the 20th Century, by the Editors of Publications International, Ltd., from http://science.howstuffworks.com/end-20th-century-flight1.htm.*

How the Mars exploration rovers work, by Marshall Brain, from http://science.howstuffworks.com/mars-rover.htm.*

How stryker works by Dave Coustan, from http://science.howstuffworks.com/stryker.htm.*

GPS/Map based road parameters acquirement for automotive control system; Tiehu Fan; Guihe Qin; Power Electronics and Intelligent Transportation System (PEITS), 2009 2nd International Conference on; vol. 2; Digital Object Identifier: 10.1109/PEITS.2009.5406918; Publication Year: 2009 , pp. 213-218.*

Song H, Zhang HY, Chan CW,"Fuzzy fault tree analysis based on T-S model with application to INS/GPS navigation system" Soft Computing vl3:il p. 31-40 2008; cited by others.*

Yang WB, Wu GQ, Dang JW, "Research and development of automatic transmission electronic control system" 2007 IEEE International Conference on Integration Technology, 2007, p. 442-445 ; cited by others.*

Xia K, Wei C,"Study on Real-time Navigation Data Model Based on ESRI Shapefile" 2008 International Conference on Embedded Software and Systems Symposia, Proceedings, 2008,p. 174-178; cited by others.*

Su HB, Chen JM, Xu JH,"A Adaptive Map Matching Algorithm Based on Fuzzy-Neural-Network for Vehicle Navigation System" 7th World Congress on Intelligent Control and Automation,vl-23,p. 4448-4452, 2008, cited by others.*

Jwo, D.-J., "Optimisation and sensitivity analysis of GPS receiver tracking loops in dynamic environments", IEE Proceedings: Radar, Sonar & Navigation, Institution of Electrical Engineers, GB, vol. 148, No. 4, Aug. 1, 2001, pp. 241-250. cited by other.*

Roth S and Singh S. Application of Robust, High-Accuracy Positioning for Autonomous Ground Vehicles [online], Aug. 2004 [retrieved on Apr. 15, 2005]. Retrieved from the Internet<URL:www.ri.cmu.edu/pubs/pub.sub.—4804.sub.—text.html>. cited by other.*

Day, Rebecca, Robots Incorporating the latest artificial intelligence technology, these robots may be smarter than you. Sep. 1, 2000, popular Mechanics.

Oliveira, P., Pascoal, A., Silva, V., Silbestre, C., On the Design and Development of Mission Control Systems for Autonomous Underwater Vehicles: An Application to the Marius AUV., Institute for Systems and Robotics, 1996.

Oliveira, P., Pascoal, A., Silva, V., Silbestre, C., Mission Control of the Marius AUV: System Design, Implementation, and Sea Trials, International Journal of System Science, 1998 pp. 1065-1080.

Murphy, Karl N., Juberts, Maris, Legowik, Steven A., Nashman, Marilyn, Schneiderman, Henry, Scott, Harry A., and Szabo, Sandor, Ground Vehicle Control at NIST: from Teleoperation to Autonomy—Presented at the Seventh Annual Operations, Applications, and Research Symposium in Houston, TX, Aug. 3-5, 1993.

Thrun, Sebastian, Learning Occupancy Grip Maps with Forward Sensor Models, Autonomous Robots, Sep. 2003 pp. 111-127.

Durfee, Edmund H., Kenny, Patrick G., Kluge, Karl C., Integrated Permission Planning and Execution for unmanned Ground Vehicles, Autonomous robots, Mar. 1998 pp. 97-110.

* cited by examiner

METHOD AND SYSTEM FOR MODULAR DATA PROCESSING FOR A VEHICLE CONTROL SYSTEM

FIELD OF THE INVENTION

This invention relates to a method and modular system for processing data for a vehicle control system.

BACKGROUND OF THE INVENTION

As autonomous vehicle operation becomes more sophisticated, an increasing number of uses for such equipment is being identified. Demand for vehicles that can perform autonomously or semi-autonomously (i.e. with some human interface) is increasing, as is an interest in vehicles that can operate in more than one of manned, semi-autonomous or autonomous mode. Additionally, as more and more vehicles are being configured to operate autonomously or semi-autonomously, there is a desire to utilize software that can be easily and cost-effectively adapted, reused, and modified as an autonomous or semi-autonomous vehicle is utilized for new or additional tasks in order to reduce costs and streamline development of new uses.

SUMMARY OF THE INVENTION

The invention described herein is a modular, extensible software system for use with multi-modal, autonomous, or semi-autonomous vehicles. The design of the present invention involves the coherent integration of modules with responsibilities for human-interaction, training, path planning, mission execution, navigation, and safety to develop and complete missions. The present invention provides a modular software system that can support multiple modes of operation (i.e. autonomous, semi-autonomous) to complete a mission. The system can be easily adapted or modified by adding new software modules or modifying existing modules as missions change or expand.

When vehicles are used for autonomous operation, there are multiple functions that must be considered and controlled. An autonomous vehicle often cannot just be powered up and set to a task without there being prior work done to create software to help define the task, control the vehicle, and execute the task. Additionally, in most situations, the vehicle must be trained or learn certain things in order to execute the task. For example, if the vehicle is to perform a task within certain boundaries, the vehicle must learn the boundaries within which it is to perform the task.

Additionally, if the vehicle is to be set up so that it can operate in multiple modes, such as autonomously, semi-autonomously, or under full control of a human, depending upon the situation, or if the operator wishes to have the ability to take over control of a vehicle operating autonomously or semi-autonomously, there must be an orderly sequence of steps that occur, often in a very short time frame, to transition the vehicle from autonomous to operator control, or vice-versa.

The present invention comprises, in one arrangement, a method of controlling a vehicle comprising the steps of characterizing a vehicle operation as a series of missions; breaking each mission into one or more mission element sets that are necessary to accomplish the mission; breaking each mission element set into one or more mission element, each mission element consisting of a mission element entity and a mission element behavior; using a modular software system to create a software program defining the mission elements in each mission element set and the mission element sets in each mission in the operation; having a mission executor execute the software program to perform each mission, its defined mission element sets and the defined mission elements to provide input to the vehicle control unit; and having the vehicle control unit direct the vehicle to perform the vehicle operation.

Another arrangement of the present invention is for a vehicle having a plurality of control modes, comprising a motorized vehicle capable of operating in at least one of autonomous, semi-autonomous or human-controlled control modes, the vehicle having a vehicle control unit capable of monitoring and controlling vehicle activity in at least one control mode; and a modular software system configured to control and direct the vehicle control unit in at least one operating mode by means of a mission executor which accepts commands from at least one mission element behavior in at least one mission element set in a software program, the commands issued by the mission element behavior providing commands to the mission executor for the vehicle control unit to direct vehicle activity.

Yet another arrangement of the present invention is for a vehicle control system for a multi-modal vehicle, the system comprising a vehicle interface module, a mission planning module, a vehicle navigation module, a mission execution module and a perception module, each of the modules capable of accepting wired or wireless communications, by means of one or more ports, from a modular software system, the communications comprising commands from one or more mission element behavior components in the modular software system, the mission element behavior components directing one or more modules in the vehicle control system to perform one or more acts.

In another arrangement of the present invention, a modular software system for controlling operations of a vehicle having a plurality of control modes via a vehicle control unit, by means of a mission executor comprises at least one mission comprising at least one mission element set, each at least one mission having an associated mission status; each at least one mission element set comprising a plurality of mission elements; each mission element comprising a mission element entity containing data about the mission element and an associated mission element behavior for controlling a structure and behavior of the associated mission element entity; and a mission executor for coordinating the mission element sets in a mission, performing the mission elements in each at least one mission element set in each at least one mission, and performing the missions in the operation sequentially.

Another arrangement of the present invention is for a method of managing a vehicle having a vehicle control unit capable of controlling the vehicle, the method comprising the steps of identifying functional service modules associated vehicle navigation, mission execution, perception, mission planning and vehicle interface services; defining specifications associated with each service module; defining an operation for a vehicle, each operation comprising a plurality of missions, each mission comprising one or more mission element sets, each mission element set having one or more mission elements; defining at least one mission element as a mission driver capable of sending commands pertaining to vehicle mobility to the mission execution module for executing at least a portion of the mission element set containing the mission driver; and defining at least one mission element as a mission action capable of communicating with one or more functional service modules for executing the mission element sets of the operation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the discussion of the FIGURES the same reference numerals will be used throughout to refer to the same or similar components. In the interest of conciseness, various other components known to the art, such as computer processing and storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning computer operation and the like have been omitted inasmuch as such details are not considered necessary to obtain a complete understanding of the present invention, and are considered to be within the knowledge of persons of ordinary skill in the relevant art. While the preferred embodiments disclosed herein address land-based vehicles, it can be appreciated that those skilled in the art can extend the use of the invention to air or sea vehicles without departing from the scope of the invention disclosed herein.

Various unique elements of the present invention are disclosed and described below in detail. The novelty in this invention is contained within the mechanisms for hierarchical expression of behavior through diverse numerous smaller-grain units known as "mission elements," and the mission execution.

Figure 1:
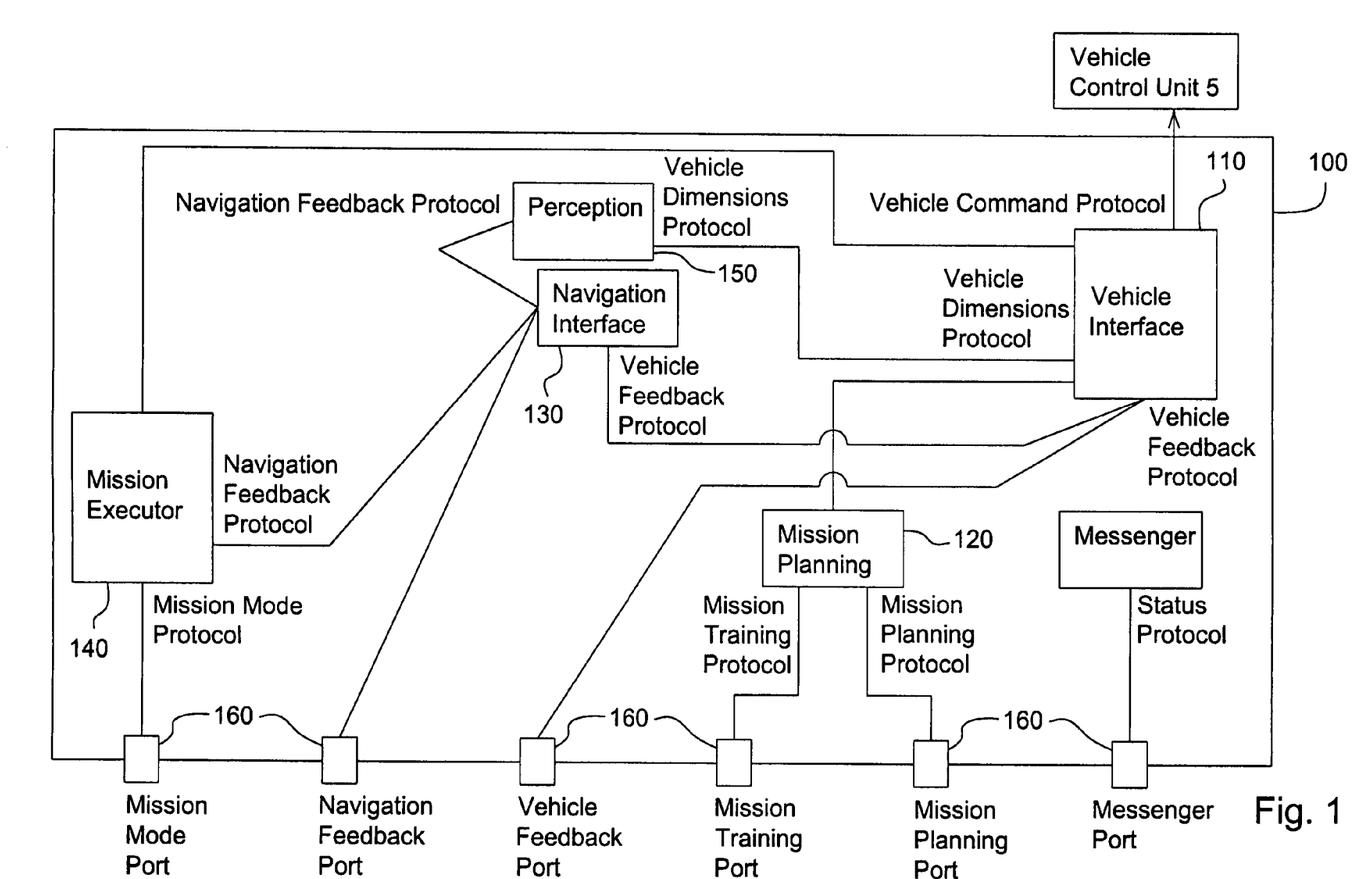
FIG. 1 is a schematic core structural view of a software system for an autonomous vehicle control system of the present invention.

FIG. 1 shows a core structural view of a sample software system for monitoring and controlling an autonomous motorized vehicle. The vehicle control system shown in FIG. 1 is for a land-based vehicle. It can be appreciated that underwater or aerial vehicles would require additional components in order to meet all operating environment variables. A system 100 includes modules for vehicle interface 110, mission planning 120, vehicle navigation 130, and mission execution 1240. The system also includes a perception sub-module 150. It can be appreciated that in a multi-mode vehicle (i.e. manual, autonomous, and semi-autonomous), when the vehicle is operating in manual or semi-autonomous mode, not all of the modules may be needed. Additionally, depending on the specific operation, it can be appreciated that additional modules might be needed, such as vehicle payload control.

The vehicle interface module 110 allows for input to the vehicle (not shown) via the vehicle control unit 5, and to and from the various other system modules. The vehicle control unit 5 is the microprocessor responsible for monitoring and controlling vehicle activity. Commands to operate the vehicle and information to the system 100 and from the vehicle are processed through the vehicle interface module 110.

The mission planning module 120 is used to develop and define a sequence of coupled mission drivers and mission actions needed to accomplish the desired mission. Mission drivers and mission actions are explained subsequently herein in greater detail. The scope of the mission and desired outcome(s), and anticipated problems are also defined as part of the mission plan. In practice, unexpected events occur which require dynamic adjustment of the planned mission. In some cases, this will require re-exercising the mission planning module 120.

Although it is some times treated as a separate entity, or part of the vehicle navigation module 130 or mission execution module 140, vehicle training can also comprise a part of mission planning module 120. The scope of vehicle training can vary, depending on the mission, and whether the mission is autonomous or semi-autonomous, but it essentially involves teaching the vehicle about the mission to be performed, including any parameters for the mission. This is typically done by a human operator teaching the system about parameters or behaviors, but it is appreciated that a variety of other training methods can also be used.

The vehicle navigation module 130 provides information on (linear and angular) position of the vehicle, velocity, and acceleration relative to some fixed coordinate frame.

The mission execution module. or mission executor (MX) 140 is used to carry out the missions created in the mission planning module 120. The mission executor 140 activates the proper devices (motors, switches, etc.) in such a way that the vehicle is deployed according to the mission goals.

The perception sub-system 150 is used to protect the vehicle and environment (including people, animals and property). The perception sub-system 150 perceives the environment and constructs occupancy and/or terrain maps. Based on these maps, adjustments in speed and direction of the vehicle may be necessary to maintain the required level of safety. The perception sub-system 150 operates in conjunction with various other modules or systems, whenever the vehicle is in motion, or preparing to go into motion.

The autonomous platform software system 100 is complemented by an external application that provides high-level direction. The high-level direction is provided wirelessly or through wired connection. As can be seen in FIG. 1, these connections are accomplished through a series of ports 160 between the system 100 and various external applications and components. In one embodiment, the external application is driven by direct user input and supervision. The user has the ability to provide inputs to train the system about its environment, configure mission-specific parameters and launch or schedule mission executions. During execution, the user can monitor the feedback signals provided by the system 100 that contain pertinent information about the vehicle and mission status.

A preferred embodiment of the present invention will utilize UML 2.0-based code generation tools, such as Rational Rose RealTime. Such tools allow for a definition of program structure through "capsules" with an expression of behavior by means of a "state machine".

Figure 2:
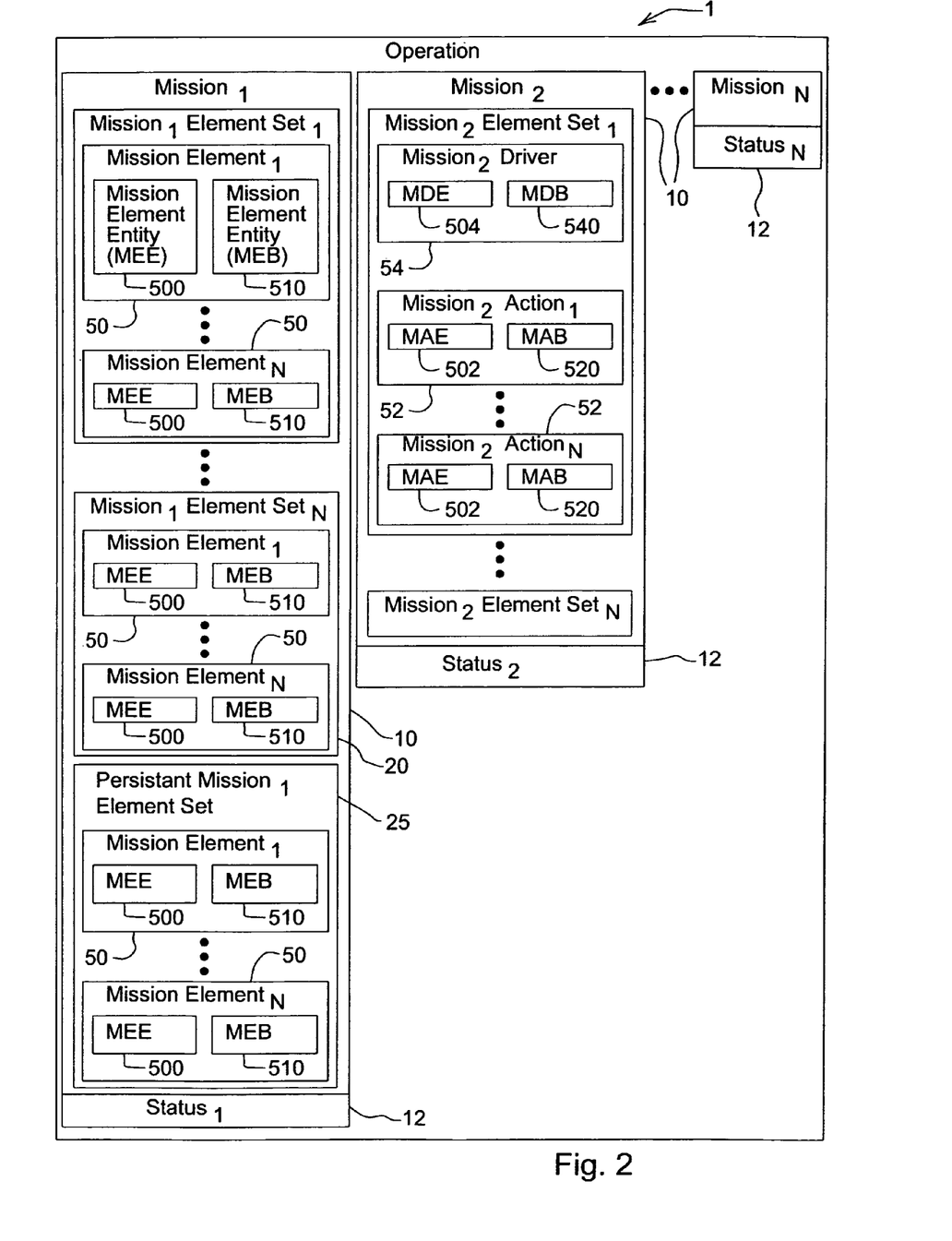
FIG. 2 is a schematic view of an operation definition using a software system of the present invention.

FIG. 2 shows an arrangement of the hierarchical structure of the modular software system of the present invention. The present invention breaks down an operation 1 to be performed by the system into a collection of items called missions 10. A mission 10 is a set of parameters and a sequence of tasks to be executed sequentially in order to perform an operation 1. The allocation of tasks among the various missions 10 that comprise an operation 1 is configured to allow flexibility in the system. Each mission 10 has an associated mission status 12, which represents the progress of the corresponding mission 10, and is updated during execution of the mission 10. At a minimum, this status would be an integer index that represents the active mission element set 20.

In the prior art, an operation was treated as one or more tasks, and the software program developed was based upon the tasks. However, in the present invention, an operation 1 is broken into a series of missions 10, which are broken into a series of tasks, each referred to as a mission element set (MES) 20. The MESs 20 in a mission 10 are executed in order to perform the mission 10. Each MES 20 is composed of a collection of small-grain entities, called mission elements (ME) 50, that execute concurrently to accomplish the specific mission element set 20. By breaking an MES 20 into smaller-grain MEs 50, all possible alternate flows can be included within the scope of an MES 20. Also, by creating smaller units of behavior, the likelihood of future software reuse of at least some MEs 50 increases. The system component modules, such as those shown in FIG. 1, provide general functionalities to support the various missions 10. These components provide services for the MEs 50, and in turn the MEs 50 have the capacity to provide input to these modules. As shown in FIG. 1, the system contains interfaces to fundamental modules that provide general functionalities to support various missions 10, such as navigation (positioning) 130. An example would be a mission action 52 that controls implement deployment, such as a reactive chemical sprayer that determines when to spray chemicals by comparing information from the vehicle navigation module 130 to an a priori map of the environment. The mission action 52 could also be configured for other functions, such as disengaging the sprayer if the vehicle speed was below a specific threshold, or if the vehicle perception module 160 determined there was a human in the vicinity of the sprayer. Furthermore, these modules are adorned with configurable attributes that provide run-time flexibility in terms of specifying parameter values and wholesale substitution of different versions of modules conforming to a specified, well-defined interface. An example would be various alternative navigation components 130, based on different positioning technology, hardware or algorithms.

Another novel feature of the present invention is the persistent mission element set (PMES) 25, a special MES 20 that can optionally be added to each mission 1, as shown in FIG. 2. The PMES 25 is special in that it is a set of mission elements 50 that are always active for the duration of the corresponding mission 10 during execution. The purpose of a PMES 25 is that it allows one to avoid duplicating an ME 50 that is needed throughout a mission 10. As can be seen in FIG. 2, not every mission 10 in an operation 1 needs to have a PMES 25.

Figure 3:
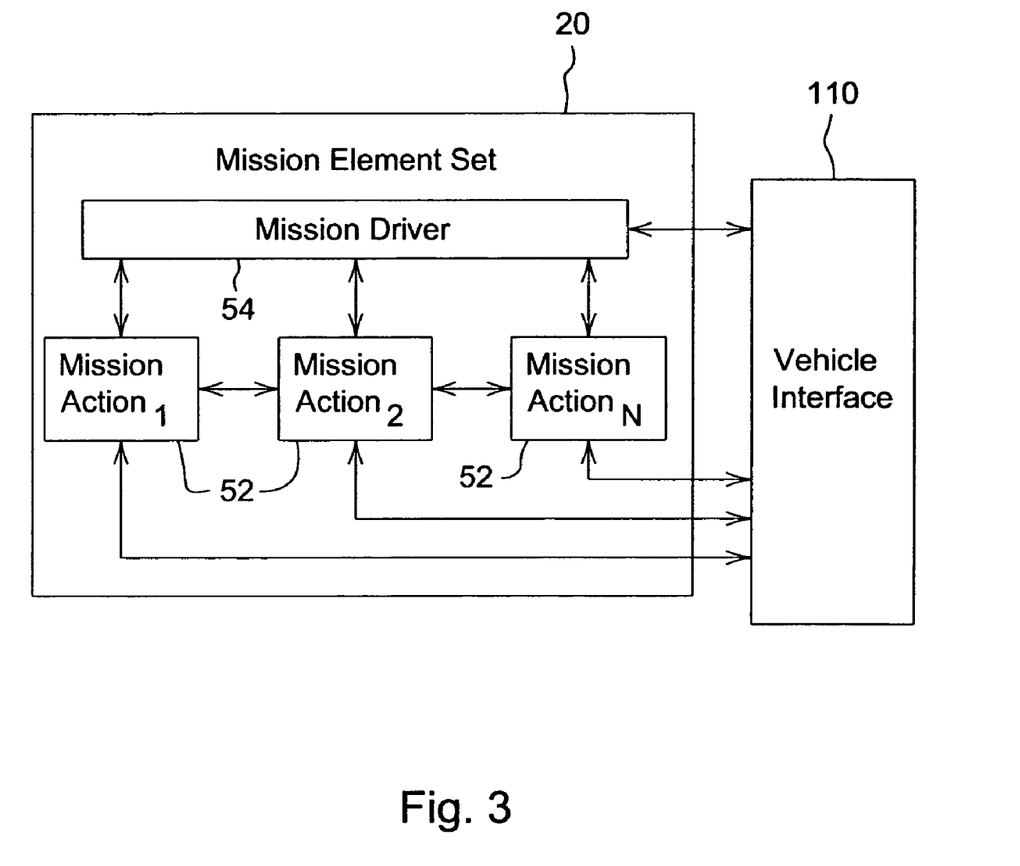
FIG. 3 is a schematic representation of the interrelationships of components of a Mission Element Set in the present invention.

In the present invention, as shown in FIGS. 2 and 3, MEs 50 are further classified into two types: Mission Actions (MA) 52 and Mission Drivers (MD) 54. An MD 54 can accept input from one or more MAs 52.

FIG. 3 shows the interactions of the MAs 52 and an MD 54 in an MES 20. A valid MES 20 can have only (zero or) one MD 54 and zero or more MAs 52. An MES 20 that has no MD 54 is one that does not exercise any active control over the mobility of the vehicle. Highly variable or application-specific aspects of operation are good candidates for MAs 52. For example, the logic that dictates how to respond to an unexpected obstacle is well represented as an MA 52. Another candidate for an MA 52 would be logic that provides for the evaluation of generic output from a perception component. Intentionally, the architecture is not overly stringent on how the system should be tailored for any given application or the precise definition of what can be allowed as an MA 52.

In some arrangements of the present invention, one or more MAs 52 may provide options or suggestions to the MD 54, which in turn, issues the desired command to the vehicle for mobility via the vehicle interface module 110. This structure of multiple MAs 52 providing input to an MD 54 provides the system with increased flexibility. The list of appropriate concurrent MAs 52 during different stages of execution of an operation would not be identical; by decomposing the problem this way, there is a natural way of expressing the MAs 52 that run in parallel during the mission 10. A real-world analogy that demonstrates the interrelationship of MAs 52 and the MD 54 in situations where the MAs 52 provide suggestions to the MD 54 can be found in a car having a driver (the MD 54) and one or more passengers. When the car is approaching an intersection, the passengers can all provide input to the driver as to what action they think should be taken at the upcoming intersection, such as turning left, turning right, or going straight (the MAs 52). However, it is the driver (MD 54) that ultimately makes the decision and provides input to the car as to the action to take (i.e. going straight when there is no oncoming traffic).

Each ME 50, whether an MA 52 or MD 54, is further broken down into a passive class, known as a Mission Element Entity (MEE) 500 and a corresponding behavioral element, known as a Mission Element Behavior (MEB) 510 that describes and controls the structure and behavior of the associated MEE 500. In order for an ME 50 to function properly, it must have both an MEE 500 and an MEB 510. The passive MEEs 500 have specific data associated with them, and that data is expressed as part of the mission 10 whenever such MEEs 500 are utilized. The MEEs 500 represent the overall description of how the class behaves as a function of time or events. The MEBs 510, in contrast, perform the meaningful calculations. The base objects MEE 500 and MEB 510 are constructed with features that are anticipated to be common and useful. By using well-known objected-oriented programming techniques, it is possible to extract commonalities at several levels when defining various MEEs 500 (and MEBs 510) and specializing them to particular applications.

When a new MES 20 in a mission 10 is to be performed, the system takes the following steps:

Any unnecessary mission elements 50 are deactivated (either stopped or destroyed, depending on the implementation). An ME 50 is unnecessary if it is neither contained in this new MES 20 or the PMES 25. An active ME 50 that is obsolete according to a new MES 20 may or may not have its data saved for future potential usage, depending on the implementation.

The ME 50 belonging to the PMES 25 that are not yet active are activated.

If any needed ME 50 is already active, depending on the implementation, it will have its data updated rather than programmatically destroying and incarnating any new processes.

The ME 50 of the new MES 20 that are not yet active are activated.

The ME 50 of the new MES 20 take precedence over the ME 50 of the PMES 25 in the sense that:

If both the new MES 20 and PMES 25 contain a Mission Driver 54, the Mission Driver 54 of the new MES 20 is used rather than that of the PMES 25.

If the same ME 50 is contained in both the new MES 20 and PMES 25, the data corresponding to the new MES 20 is used when launching the respective ME 50 rather than the data associated with the instance of the ME 50 contained in the PMES 25.

When a code generation tool that defines program structure through "capsules" is used, the Mission Element Behaviors 510 take the form of capsules. The capsule hierarchy mirrors class hierarchy, as in object-oriented programming so that each MEE 500 has a counterpart MEB 510. Commonalities can be extracted down the inheritance tree by defining a base mission driving behavior (MDB) 540 and mission action behavior 520, which correspond to an MD 54 and MA 52, respectively. Similarly, the mission driving entity (MDE) 504 and mission action entity (MAE) 502 can also be defined with a base behavior. One implementation of the present invention utilizes a "factory of factories" design pattern allowing for easy run-time configuration and customization of the system. The system incorporates a top level factory that is aware of all the modules and specialized components for a particular operation 1, and the interfaces between the modules, vehicle and software for performing the operation. The top level factory contains a mission factory that contains specific details on how the mission executor (MX) 140 operates for a given implementation. The top level factory also contains factories of MEEs and MEBs, which is essentially a collection of MEEs and MEBS that can be utilized in a specific implementation. The top level factory also contains a factory of client adapters, which include the special communication ports for the implementation, accommodating for the specific interactions between the vehicle and the client.

Figure 4:
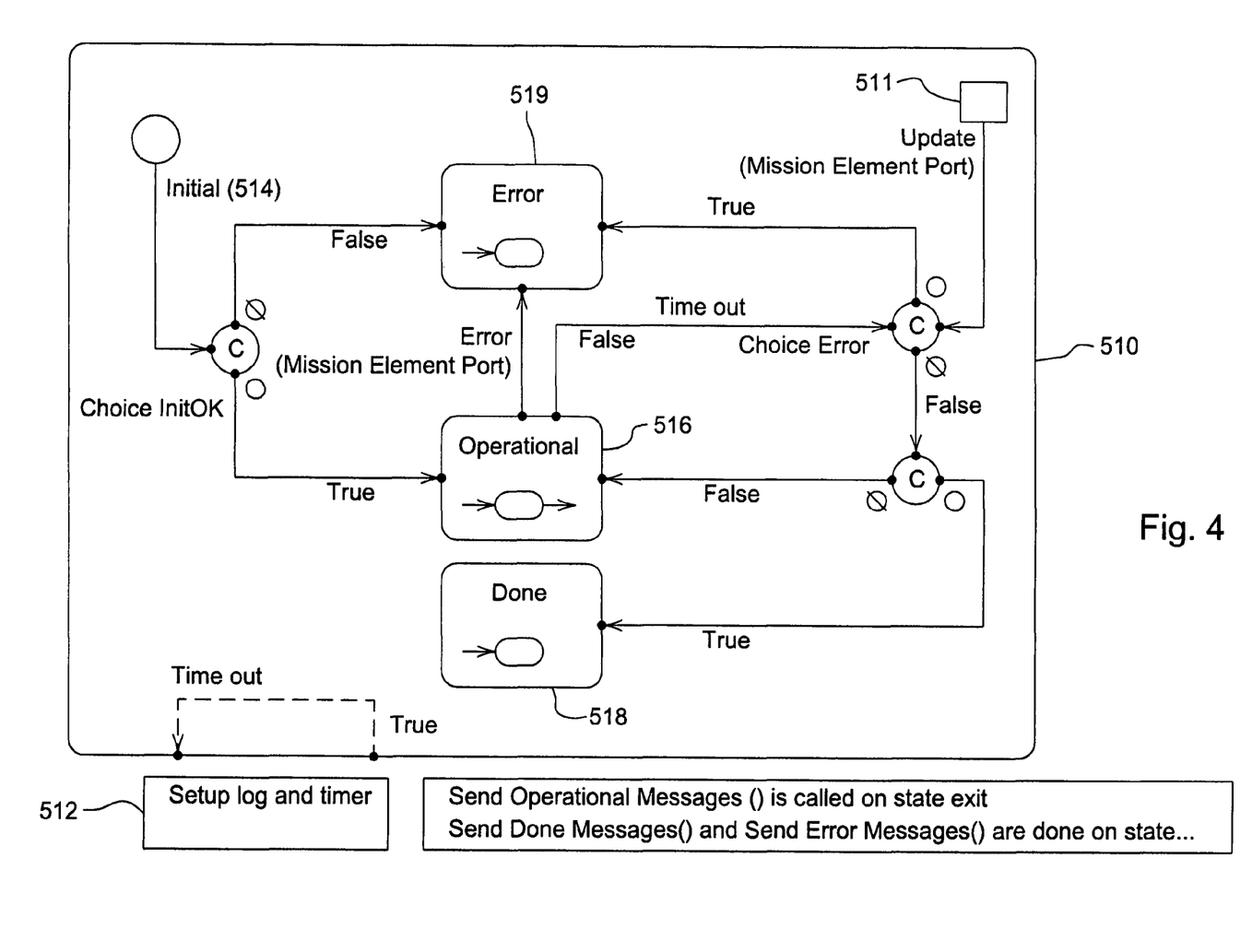
FIG. 4 is a schematic state machine view of a Mission Element Behavior of the present invention.

FIG. 4 shows a "state machine" view of an MEB. The MEB 510 has the following commonalities:

Ability to set period of execution at runtime via a configuration file, of which there can be more than one.

Automatic creation of log files 512 for diagnostics and facilitating data playback.

Ports 511 for sending signals to the Mission Executor 140 (not shown), described below, as well as logging, timing and client messaging services.

Generic expression of initialization 514 and operational states 516 that are executed at the defined time. The operational state 516 is where meaningful specialization of the state machine is made. States for completion 518 and error conditions 519 are also present.

The MEB 510 makes calls to the respective ME 50 routines to accomplish work. Inside the Operational state 516 of the Mission Element Behavior 510, a specific state diagram can be created that expresses how work is performed by the passive class MEE 500, although the computations do not have to take place here, in order to provide for greater flexibility.

In an MES 20, any MEB 510 can signal "Done" to the Mission Executor 140, which will result in the execution of the next MES 20.

If an MEB 510 will persist for more than one MES 20, but is not part of a PMES 25, the MEB 510 can be updated and brought forward to the next MES 20.

Figure 5:
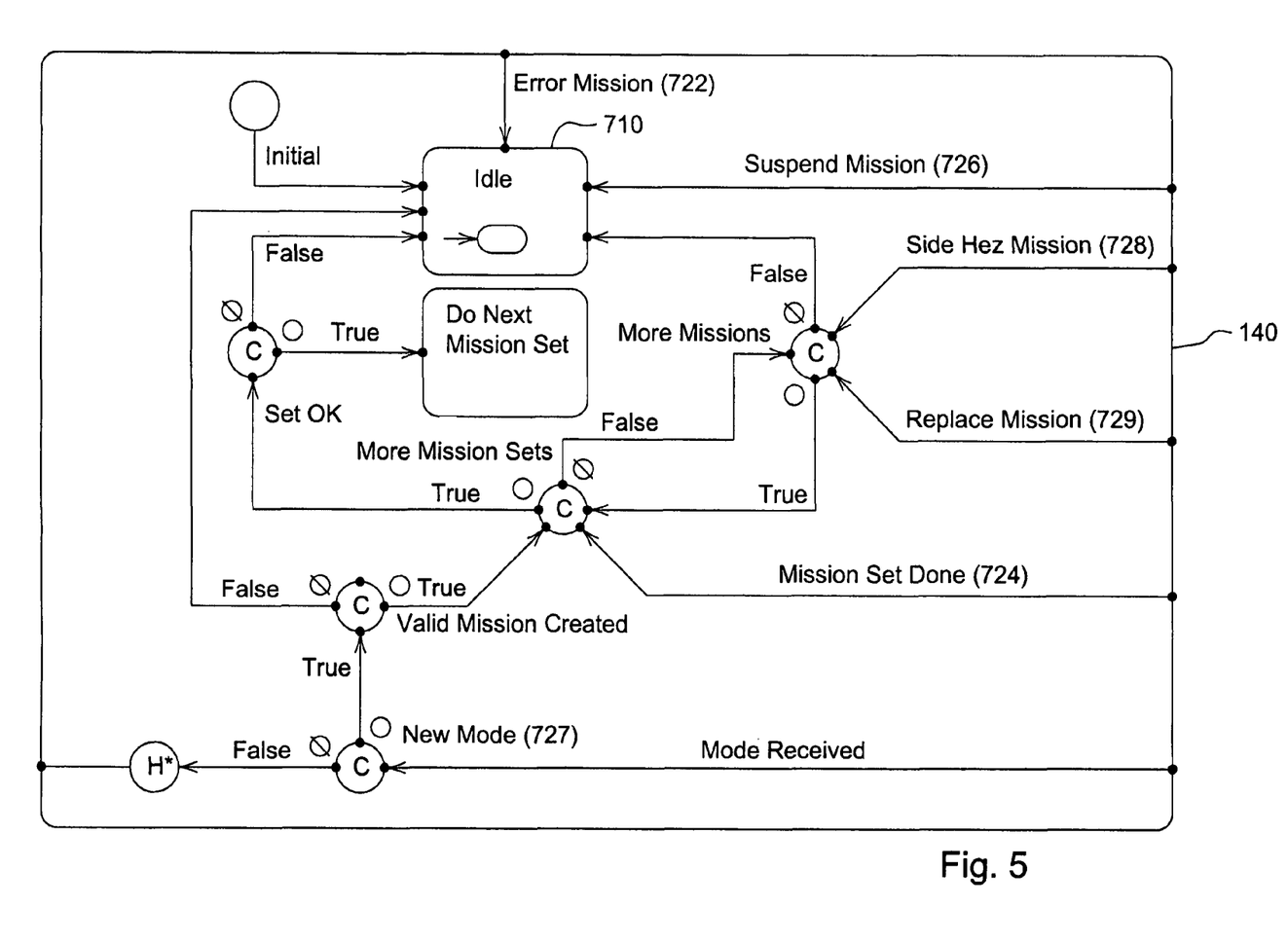
FIG. 5 is a schematic state machine view of the Mission Executor of the present invention.

Another unique aspect of the present invention pertains to the execution of the mission. FIG. 5 provides a "state machine" view of the mission executor (MX) 140. The MX 140 is responsible for executing the operation 1 as expressed by MDs 54, and coordinating the MES in each mission 10. The MX 140 will, for an operation 1, perform each MES 20 sequentially, including any PMES 25 where appropriate. When all the MES 20 of an operation 1 are exhausted, the system transitions to an idle state 710. The nominal situation is that an ME 50 of a given MES 20 will signal "Done" 724 to the MX 140, which triggers the update of the mission status 12 and the execution of the next MES 20 in the queue. A feature of this invention is that every MEB 510 has the ability to send the following signals to the MX 140:

Error 722—End the execution of the operation.

Done 724—End the execution of the MES 20 to which they belong

Suspend 726—Suspend the operation. In some cases, the mission 10 can be resumed later.

SideMission 728—Create a new mission 10 that is executed, whereby the mission 10 to whom the ME 50 belongs is moved down to the second position in the queue of the MX 140.

Replace 729—Substitute the current mission 10 for one that the given ME 50 provides.

Insert 727—Add a new mission 10 to an arbitrary location in the operation queue.

Such capabilities provide the flexibility to accommodate many sets of requirements as necessitated by the application. Flexibility of expression is provided by allowing MEB 510 to alter the a priori operation 1 by modifying the operation queue, or the order or sequence of missions 10 in the operation 1. By having flexibility at this very low-level, the system is more easily customizable than those found in prior art. The latter four signals above (suspend 726, sidemission 728, replace 729 and insert 727), empower an MEB 510 to create alternate flows of execution.

Figure 6:
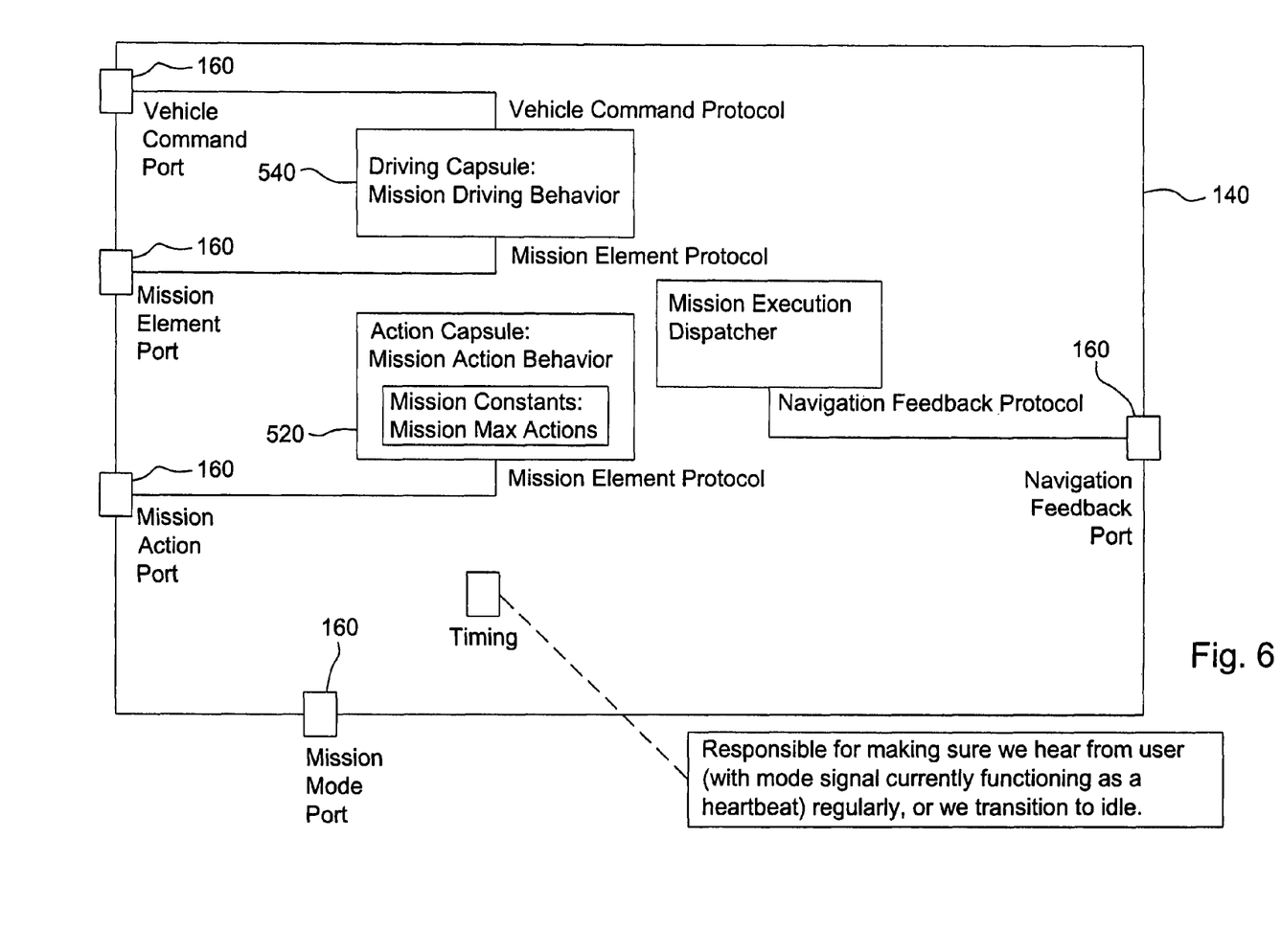
FIG. 6 is a schematic structural view of the Mission Executor of the present invention.

FIG. 6 provides a view of the structural view of the MX 140 defined through capsules. As can be seen, the MDB 540 and MAB 520, which have been defined using a capsule hierarchy, are activated by the MX 140 as needed. As was previously explained, communications between modules are accomplished through a series of ports 160, with the MDB 540 or MAB 520 sending signals to a port 160 to signal deed status.

Figure 7:
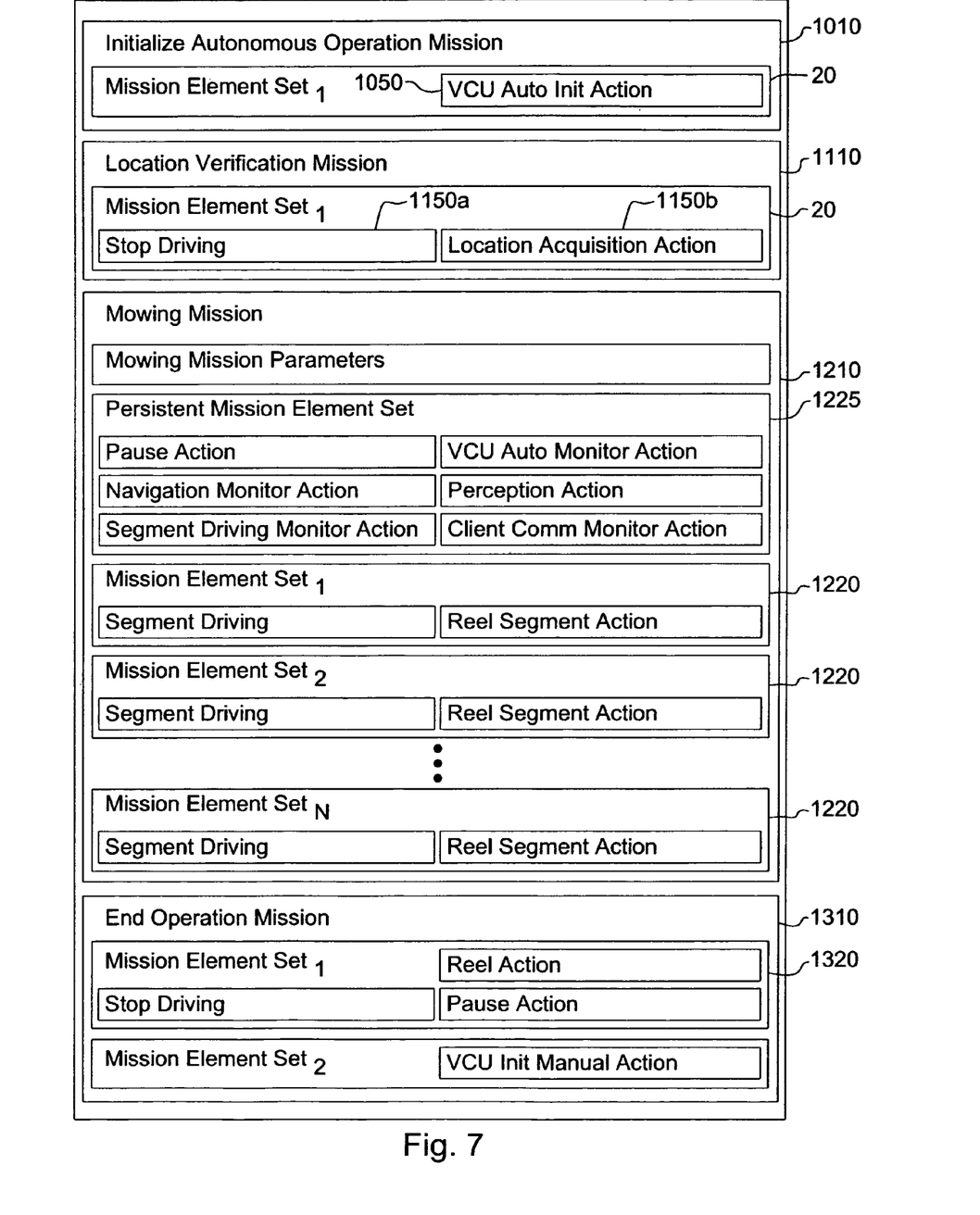
FIG. 7 is a schematic view of the mission elements of a sample operation utilizing the present invention.

FIG. 7 shows an example of one embodiment of the software of this invention, for the autonomous mowing of a sports turf field utilizing a mower capable of both autonomous and manual operation. The specific map of the area to be mowed and the mowing pattern must be defined as part of the mission planning phase. A processor called a Vehicle Control Unit (VCU) 5 is responsible for control of the mowing device and vehicle-specific sensors. Communications with the vehicle control unit 5 are achieved by means of the vehicle interface module 110. A requirement for the system is that during autonomous mode operation, if an operator were to actuate the steering wheel or pedals, the vehicle will revert to manual mode and report an "override" condition. Additionally, the system is required to provide for the ability of operator-controlled transition back to autonomous operation and completion of the mission. Various other features and characteristics must be anticipated and planned for, such as obstacle avoidance. Also, in order for autonomous mowing to be possible, the vehicle has to be trained as to what areas to mow, in what direction, and whether or not to raise/lower the mowing device at any point or points during the mowing process, etc. Once the operation 1 has been planned and defined, and the vehicle trained, autonomous mowing is possible.

In order for the defined mowing operation to occur, the first step is for the mower to be placed in the same location as when the mowing operation was originally defined during mission planning. For this reason, the first two missions 10 in the operation 1 are for initialization 1010 and location verification 1110. The initialization mission 1010 ensures the vehicle is ready for autonomous control. Once it has been determined the vehicle is ready for autonomous control, the second mission, for location verification 1110, is executed. The location verification mission 1110 evaluates whether a trajectory is needed from the vehicle's current location to the start of the mowing mission. If no such trajectory is necessary, as would be the case if the vehicle were sufficiently close to the desired pose, the location verification mission 1110 terminates, and the mowing mission 1210 will begin. On the other hand, if the location verification mission 1110 determines that a trajectory is needed to get to the desired pose, it creates a new mission 10' for the location acquisition. The result of execution of the location acquisition mission 10' is that the vehicle will, under nominal conditions, position the vehicle at the beginning pose for the next mission in the operation, the mowing mission 1210, and the mission executor 140 will then begin the mowing mission 1210. The mowing mission 1210 represents the main objective of mowing the sports turf field, while a fourth mission, the end operation mission 1210 embodies the application-specific requirements associated with completion of mowing.

The missions of the operation are as set out below and in FIG. 7. Where applicable, those MEEs/MEBs that send important signals to the mission executor 140 are mentioned.

The Initialization Mission 1010 is for ensuring the vehicle is ready for entry into autonomous mode. The contents of the Initialization Mission 1010 are as follows:

Mission Element Set 20:

VCUAutoInit 1050: Gets mower into autonomous mode then sends the Done signal 724 to the Mission Executor 140. If an error occurs, the Error signal 722 is sent to the mission executor 140, which ends the operation The Location Verification Mission 1110 is for comparing the current position of the vehicle, and if not in the correct position to begin mowing, get the vehicle moved to the proper position.

Mission Element Set 20

StopDriving 1150a: Sends zero speed commands indefinitely.

LocationAcquirePlanningAction 1150b: Checks to see if mower is close to start location. If the vehicle is close to the start pose, this Action sends the Done signal 724 to the mission executor 140. If far from the start pose, the Replace signal 729 is sent to the mission executor 140, to execute a point-to-point mission to maneuver the mower to the start location. The point-to-point mission 10' is calculated by the mission planner 120.

Mow stadium Mission 1210 includes the steps necessary for the goal of mowing the stadium.

Persistent Mission Element Set 1225

PauseAction 1225a: Provides the service of allowing other components (other MEs 50) to ask the vehicle to temporarily stop moving. If excessive time elapses, it will send the Done signal 724 to the MX 140.

NavigationMonitorAction 1225b: Monitors the quality of the Navigation Interface 130 output. If appropriate, it will make vehicle slow down or pause/stop.

SegmentDrivingMonitorAction 1225c: Monitors the quality of the path tracking behavior performance. If appropriate, it can also make vehicle slow down or pause/stop.

VCUAutoMonitorAction 1225d Interacts with vehicle interface module 110 to maintain auto mode and handle override conditions and errors appropriately. It may send Error 722 or Suspend 726 signal to the MX 140.

SafeguardingAction 1225e: provides safeguarding for vehicle when operating during the Mowing Mission 1210.

ClientCommMonitorAction 1225f: Receives signals indicating a loss of connectivity. It will pause the mower (PauseAction 1225a) if connection is lost for an excessive amount of time.

Mission Element Set 1220 (There is one MES like this for each segment of the mowing mission.

SegmentDriving 1220a drives the given segment at the given speed.

ReelSegmentAction 1220b keeps the mower reels in designated state.

End operation Mission 1310 includes the steps necessary to make the mower stop and wait for the operator to take over direct control of the vehicle. If a certain time elapses without attention, the vehicle will revert to manual mode, resulting in the engine turning off, due to safety interlocks.

Mission Element Set 1 1320

StopDriving 1320a sends zero speed to vehicle indefinitely.

ReelAction 1320b keeps reels up and not spinning indefinitely.

PauseAction 1320c a permanent pause state, signals Done to MX 140 when timer expires.

Mission Element Set 2 1320

VCUInitManualAction 1320d gets vehicle back into manual mode.

It can be appreciated that the example provided could be easily modified as different needs arose. For example, suppose it was desired to add the capability of having the vehicle automatically follow an on-foot operator from a garage or depot onto the field as a precursor to the above operation. This could be mechanized by defining a Mission Element Set 20 that had a FollowPersonDrivingBehavior. This MES 20 would utilize perception data and generate appropriate mobility commands, and would signal "Done" to the MX 140 when the exit criteria was met, such as proximity to start location or specified area on the field. Such an MES 20 could be, for example, inserted after the Initialization mission 1010, above.

Other additions/modifications could also be made to the above operation. For example, another simple extension to the above operation would be to allow for cooperative driving with an operator, as well as the specified autonomous mowing operation. For example, if it was desired to allow, at any time, the operator to take control of the vehicle until a button was released or other input was activated, such an override could be configured in the program. One approach could be implemented by subclassing the SegmentDrivingBehavior 1220a to yield priority to such external inputs, for example. A second approach would be to add another Mission Element 1225g to the PMES 1225 that monitors for actuation of the joystick; when such actuation is detected, a side mission 10" is created that is specifically tailored to embody the requirements of cooperative driving. Under this scenario, the transient side mission 10" would remain active until the button or similar input was released.

An example of a mission 10 for the above case would be for use with direct teleoperation. In this mode, the user is providing mobility commands, and has direct control over various actuators and peripheral devices. In one embodiment, this mission would have only a single MES 20, whose elements 50 are Teleoperation Driving 54, together with various MAs 52 to support control over the aforementioned actuators and devices. By partitioning the control into more than one MA 52, better software reusability can be achieved, and a novel extension of direct teleoperation is more easily achieved, by simply adding or subtracting the appropriate mission elements 50.

Having described the preferred embodiment, it will become apparent that various modifications can be made without departing from the scope of the invention as defined in the accompanying claims.

The invention claimed is:

1. A processor-implemented method of controlling a vehicle via a vehicle control unit for monitoring and controlling the vehicle, the method comprising the steps of:
   characterizing a vehicle operation as a series of missions;
   breaking each mission into one or more mission element sets that are necessary to accomplish the mission;
   breaking each mission element set into one or more mission elements, each mission element consisting of a mission element entity and a mission element behavior, wherein the mission element entity represents how the mission element functions over time, and wherein the mission element behavior performs calculations for the mission element;
   defining the mission elements in each mission element set and the mission element sets in each mission in the operation, wherein the mission elements in the mission element set comprise a mission driver for providing direction to the vehicle control unit for commanding the vehicle to perform a mobility act and at least one mission action for providing input to the mission driver about possible actions;
   executing the mission, via a mission executor, to perform each mission, its defined mission element sets, and the defined mission elements to provide input to the vehicle control unit;
   determining whether any existing mission elements are already executing prior to the series of missions and not present in the series of missions;
   responsive to a determination that existing mission elements are already executing prior to the series of missions and not present in the series of missions, deactivating existing mission elements; and
   directing the vehicle, via the vehicle control unit, to perform the vehicle operation.

2. The method of claim 1 wherein one mission element set of at least one mission is a persistent mission element set, wherein the persistent mission element set is always active during execution of the at least one mission.

3. A vehicle control system for a vehicle having a plurality of control modes, the system comprising:
   a motorized vehicle for operating in at least one of autonomous, semi-autonomous or human-controlled control modes, the motorized vehicle having a vehicle control unit for monitoring and controlling vehicle activity in at least one control mode; and
   a modular software system configured to control and direct the vehicle control unit in at least one operating mode by means of a mission executor which accepts commands from at least one mission element behavior in at least one mission element set in a software program, the commands issued by the mission element behavior providing commands to the mission executor for the vehicle control unit to direct vehicle activity, wherein mission elements in the mission element set comprise a mission driver for providing direction to the vehicle control unit for commanding the vehicle to perform a mobility act and at least one mission action for providing input to the mission driver about possible actions.

4. A modular system for controlling operations of a vehicle having a plurality of control modes via a vehicle control unit, the modular system comprising:
   a processor; and
   a modular software system, stored in a medium, operating via the processor, the modular software system comprising:
      at least one mission comprising at least one mission element set, each at least one mission having an associated mission status;
      each at least one mission element set comprising a plurality of mission elements, wherein the plurality of mission elements in a mission element set comprise at least one mission driver and at least one mission action, wherein the plurality of mission elements in the mission element set comprise a mission driver for providing direction to the vehicle control unit for commanding the vehicle to perform a mobility act and at least one mission action for providing input to the mission driver about possible actions;
      each mission element comprising a mission element entity containing data about the mission element and an associated mission element behavior for controlling a structure and behavior of the associated mission element entity, wherein the mission element entity represents how the mission element functions over time, and wherein the mission element behavior performs calculations for the mission element; and
      a mission executor for coordinating the mission element sets in a mission, performing the mission elements in each at least one mission element set in each at least one mission, performing the missions in the operation sequentially, and deactivating existing mission elements in response to a determination that existing mission elements are already executing prior to the at least one mission and not present in the at least one mission.

5. A processor-implemented method of managing a vehicle having a vehicle control unit for controlling the vehicle, the method comprising the steps of:
   identifying one or more functional service modules associated with vehicle navigation, mission execution, perception, mission planning, and vehicle interface services;
   defining specifications associated with each service module;
   defining an operation for the vehicle, each operation comprising a plurality of missions, each mission comprising one or more mission element sets, each mission element set having one or more mission elements;
   defining at least one mission element of the one or more mission elements as a mission driver for sending commands pertaining to vehicle mobility to the mission execution module for executing at least a portion of the mission element set containing the mission driver;
   defining the at least one mission element of the one or more mission elements as a mission action for communicating with the one or more functional service modules for executing the mission element sets of the operation, wherein the mission elements in the mission element set comprise a mission driver for providing direction to the vehicle control unit for commanding the vehicle to perform a mobility act and at least one mission action for providing input to the mission driver about possible actions;

executing the mission, via a mission executor, to perform each mission, the mission element sets of each mission, and each of the at least one mission elements to provide input to the vehicle control unit;

determining whether any existing mission elements are already executing prior to the series of missions and not present in the series of missions;

responsive to a determination that existing mission elements are already executing prior to the series of mission and not present in the series of missions, deactivating existing mission elements; and directing the vehicle, via the vehicle control unit, to perform the operation for the vehicle.

6. The modular system of claim 4 wherein the mission element behavior sends the mission executor a signal to replace the current mission with another mission in the operation.

7. The modular system of claim 4 wherein the mission element behavior sends the mission executor a signal that the mission element set containing the mission element behavior has been completed.

8. The modular system of claim 4 wherein the mission element behavior sends the mission executor a signal to add a mission to the operation.

9. The modular system of claim 4 wherein the mission element behavior sends the mission executor a signal to suspend execution of the operation.

10. The modular system of claim 4 wherein the mission element behavior sends the mission executor a signal to end execution of the operation.

11. The modular system of claim 4 wherein at least one mission element set in at least one mission is a persistent mission element set.

12. The modular system of claim 4 wherein each mission driver comprises a mission driver entity containing data about the mission driver and an associated mission driver behavior for controlling a structure and behavior of the associated mission driver entity.

13. The modular system of claim 4 wherein each mission action comprises a mission action entity containing data about the mission action and an associated mission action behavior for controlling a structure and behavior of the associated mission action entity.

* * * * *